(12) United States Patent
Tanaka

(10) Patent No.: US 7,911,553 B2
(45) Date of Patent: Mar. 22, 2011

(54) LIQUID CRYSTAL DISPLAY DEVICE

(75) Inventor: Shigekuni Tanaka, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 266 days.

(21) Appl. No.: 11/481,863

(22) Filed: Jul. 7, 2006

(65) Prior Publication Data

US 2007/0008451 A1    Jan. 11, 2007

(30) Foreign Application Priority Data

Jul. 7, 2005    (JP) ................................. 2005-199033

(51) Int. Cl.
*G02F 1/1333* (2006.01)

(52) U.S. Cl. .......................................... 349/58; 349/60

(58) Field of Classification Search ........................ None
See application file for complete search history.

(56) References Cited

U.S. PATENT DOCUMENTS

| | | | |
|---|---|---|---|
| 5,453,855 A * | 9/1995 | Nakamura et al. ............. | 349/58 |
| 5,729,310 A * | 3/1998 | Horiuchi et al. ................ | 349/62 |
| 6,885,411 B2 * | 4/2005 | Ogawa et al. ................... | 349/58 |
| 6,910,784 B2 * | 6/2005 | Ito ................................... | 362/632 |
| 7,113,235 B2 * | 9/2006 | Tsukamoto ...................... | 349/58 |
| 7,298,432 B2 * | 11/2007 | Kwon et al. ..................... | 349/58 |
| 7,344,291 B2 * | 3/2008 | Hatanaka et al. ............... | 362/610 |
| 7,585,099 B2 * | 9/2009 | Kim et al. ....................... | 362/614 |
| 7,742,121 B2 * | 6/2010 | Mori et al. ....................... | 349/58 |
| 2002/0015005 A1 | 2/2002 | Imaeda | |
| 2004/0008512 A1 * | 1/2004 | Kim ................................ | 362/235 |
| 2005/0099556 A1 | 5/2005 | Shimojoh | |

FOREIGN PATENT DOCUMENTS

| | | | |
|---|---|---|---|
| JP | 10-022665 | * | 1/1998 |
| JP | 2005-183536 | | 7/2005 |

* cited by examiner

*Primary Examiner* — Uyen-Chau N Le
*Assistant Examiner* — Chad H Smith
(74) *Attorney, Agent, or Firm* — Antonelli, Terry, Stout & Kraus, LLP.

(57) ABSTRACT

The present invention provides a liquid crystal display device which aims at the reduction of thickness thereof while preventing a holder and a light emitting element of a backlight from coming into contact with each other. The liquid crystal display device includes a backlight and a liquid crystal display panel which is arranged above the backlight, wherein the backlight includes a frame-like holder and a light emitting element which is housed in the inside of the holder, the holder includes support portions which support the liquid crystal display panel, the light emitting element is housed in the inside of the holder at the support portion on a side opposite to the liquid crystal display panel, the support portion includes a recessed portion which is formed on a side opposite to a side which supports the liquid crystal display panel and at a position which faces the light emitting element in an opposed manner. A distal end portion of the light emitting element on a side which faces the support portion in an opposed manner is positioned in the inside of the recessed portion.

14 Claims, 4 Drawing Sheets

LIQUID CRYSTAL DISPLAY DEVICE

The present application claims priority from Japanese application JP2005-199033 filed on Jul. 7, 2005, the content of which is hereby incorporated by reference into this application.

BACKGROUND OF THE INVENTION

1. Field of the Invention

The present invention relates to a liquid crystal display device, and more particularly to a technique which is effectively applicable to a backlight which houses light emitting elements such as white light emitting diodes (LED) therein.

2. Description of the Related Arts

A TFT (Thin Film Transistor) type liquid crystal display module having a miniaturized liquid crystal panel which is capable of performing a color display with the number of sub color pixels of approximately 240×320×3 has been popularly used as a display part of a portable equipment such as a mobile phone.

Generally, a liquid crystal display module includes a liquid crystal display panel and a backlight which radiates light to the liquid crystal display panel. Here, the liquid crystal display module which is used as a display part of a portable equipment such as a mobile phone uses, for example, white light emitting diodes as a light source of the backlight. The white light emitting diodes are mounted in the inside of a holder which constitutes a component of the backlight.

SUMMARY OF THE INVENTION

In recent years, also in the liquid crystal display module which is used as the display part of the portable equipment such as the mobile phone, there has been a demand for the reduction of thickness of the display module. In an attempt to reduce the thickness of the liquid crystal display module, it may be possible to reduce a clearance between the holder and the white light emitting diodes of the backlight to a limit of tolerance of parts.

However, in such a technique, there may arise a case in which a profile size of the white light emitting diode bulges in a reflow step and the holder and the white light emitting diodes of the backlight are brought into contact with each other.

The contact between the holder and the white light emitting diodes of the backlight invites not only physical rupture of the white light emitting diodes but also a drawback that a light guide plate and the white light emitting diodes which constitute components of the backlight are offset from each other thus degenerating the brightness property.

To prevent the contact between the holder and the white light emitting diode of the backlight, it may be possible to reduce a thickness of the holder. However, when the thickness of the holder is reduced, there arise drawbacks such as shrinkage in injection molding and lowering of strength.

The present invention has been made to overcome these drawbacks of the above-mentioned prior art and it is an object of the present invention to provide a technique which can reduce a thickness of a liquid crystal display device while preventing a holder and a light emitting element of a backlight from coming into contact with each other.

The above-mentioned and other objects and novel characteristics of the present invention will become apparent from a description of this specification and attached drawings.

To explain the summary of typical inventions among the invention disclosed in this specification, they are as follows.

To overcome the above-mentioned drawbacks, the present invention is characterized in that a liquid crystal display device includes a backlight and a liquid crystal display panel which is arranged above the backlight, wherein the backlight includes a frame-like holder and a light emitting element which is housed in the inside of the holder, the holder includes support portions which support the liquid crystal display panel, the light emitting elements are housed in the inside of the holder at the support portion on a side opposite to the liquid crystal display panel, and the support portion includes recessed portions which are formed on a side opposite to a side which supports the liquid crystal display panel and at positions which face the light emitting element in an opposed manner.

Further, in the present invention, it is preferable that the light emitting element is formed of a white light emitting diode and a distal end portion of the light emitting element on a side which faces the support portion in an opposed manner is positioned in the inside of the recessed portion.

Further, in the present invention, it is preferable that the light emitting element is mounted on a flexible printed wiring board, and the flexible printed wiring board is fixed to a frame portion of the holder.

To briefly explain an advantageous effect obtained by the typical invention among the inventions disclosed in this application, they are as follows.

According to the liquid crystal display device of the present invention, it is possible to reduce the thickness of the liquid crystal display device while preventing the holder and the light emitting element of the backlight from coming into contact with each other.

DESCRIPTION OF THE PREFERRED EMBODIMENT

Hereinafter, an embodiment of the present invention is explained in detail in conjunction with drawings.

Here, in all drawings for explaining the embodiment, same symbols are given to parts having identical functions and the repeated explanation is omitted.

The liquid crystal display module of the embodiment of the present invention is a TFT type liquid crystal display module having a miniaturized liquid crystal panel which is capable of a color display with the number of sub pixels of approximately 240×320×3 and is used as a display part of a portable equipment such as a mobile phone.

The liquid crystal display module of the present embodiment is constituted of a backlight and a liquid crystal display panel which is arranged above the backlight.

Figure 1:
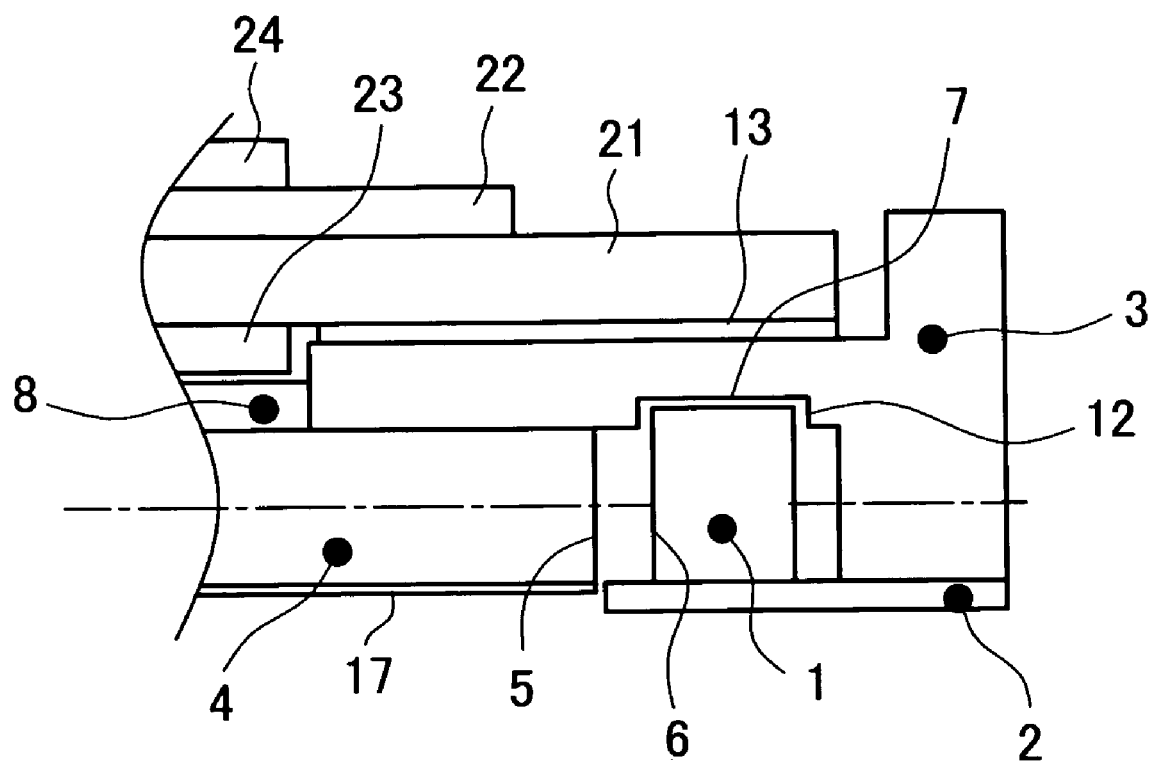
FIG. 1 is a cross-sectional view showing the cross-sectional structure in the vicinity of a white light emitting diode which constitutes a light emitting element in a liquid crystal display module of this embodiment of the present invention.

FIG. 1 is a cross-sectional view showing the cross-sectional structure of the liquid crystal display module of the present invention in the vicinity of a white light emitting diode which constitutes the light emitting element.

In FIG. 1, numeral 1 indicates white light emitting diodes, numeral 2 indicates a flexible printed wiring board (FPC), numeral 3 indicates a holder, numeral 4 indicates a light guide plate, numeral 5 indicates an incident surface of the light guide plate 4, numeral 6 indicates a light emitting surface of the white light emitting diode 1, numeral 7 indicates a clearance, numeral 8 indicates a group of optical sheets (a lower diffusion sheet, a pair of lens sheets, an upper diffusion sheet), numeral 13 indicates a pressure sensitive adhesive double coated tape, numeral 17 indicates a reflection sheet, numeral 21 indicates a TFT substrate, numeral 22 indicates a counter substrate and numerals 23, 24 indicate polarizers.

The liquid crystal display panel is constituted in a state that the TFT substrate 21 on which pixel electrodes, thin film transistors and the like are mounted and the counter substrate 22 on which color filters and the like are formed are overlapped to each other with a predetermined gap therebetween and both substrates are laminated to each other using a sealing material which is provided in a frame shape in the vicinity of a peripheral portion between both substrates, and a liquid crystal is filled in the inside of the sealing material arranged between both substrates via a liquid crystal filling port which is formed in a portion of the sealing material and sealed and, further, the polarizers (23, 24) are adhered to the outer sides of both substrates.

Here, the present invention does not relate to the inner structure of the liquid crystal panel and hence, the detailed explanation of the inner structure of the liquid crystal panel is omitted. Further, the present invention is applicable to the liquid crystal panel having any structure.

The backlight of this embodiment includes the group of the optical sheets 8 which is constituted of the lower diffusion sheet, two lens sheets and an upper diffusion sheet, the light guide plate 4, a reflection sheet 17 which is arranged below the light guide plate 4, the white light emitting diodes 1 which are arranged on a side surface of the light guide plate 4. The backlight of this embodiment is constituted in a state that the group of the optical sheets 8, the light guide plate 4, the reflection sheet 17 and the white light emitting diodes 1 are arranged in the inside of the holder 3 in order as shown in FIG. 1.

Figure 2A:
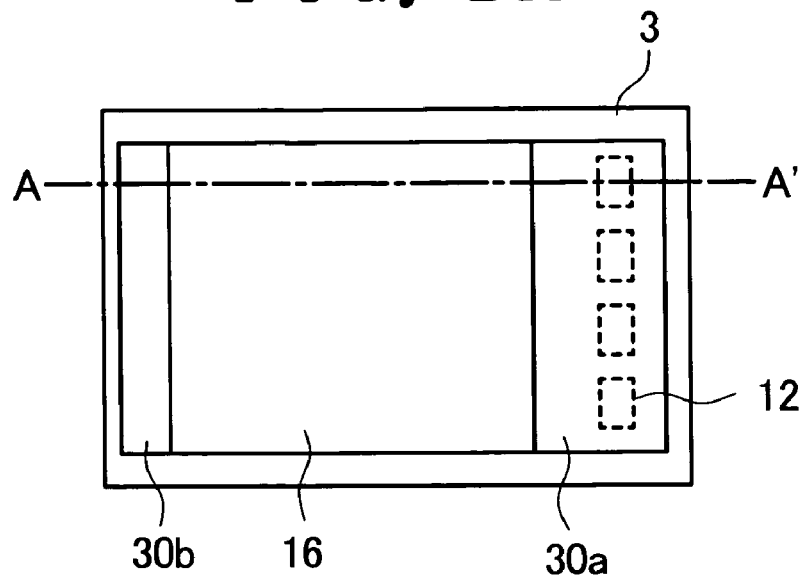
FIG. 2A to FIG. 2C are views for explaining a shape of a holder shown in FIG. 1.
Figure 2B:
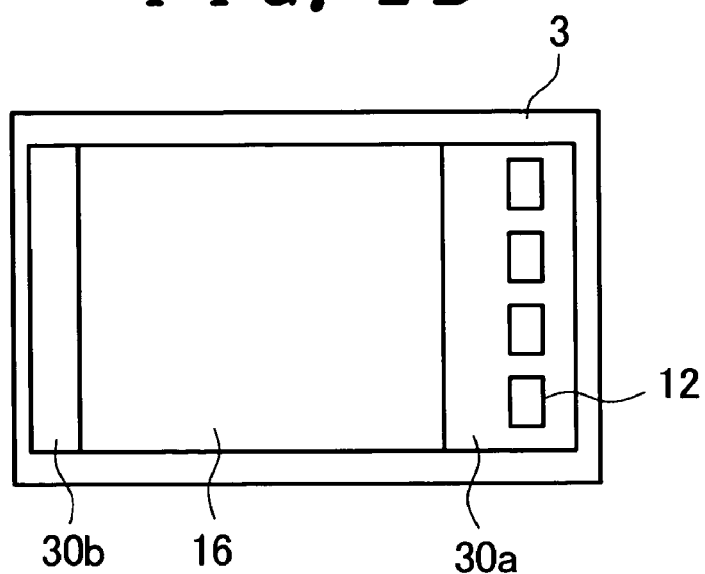
Figure 2C:
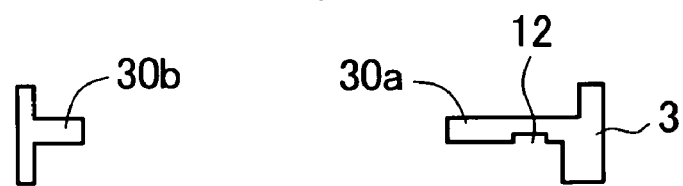

FIG. 2A to FIG. 2C are views for explaining a shape of the holder shown in FIG. 1. FIG. 2A is a view of the holder shown in FIG. 1 as viewed from the above (the liquid crystal display panel side), FIG. 2B is a view of the holder shown in FIG. 1 as viewed from below (the light guide plate side) and FIG. 2C is a cross-sectional view taken along a A-A' in FIG. 2A. In FIG. 2A to FIG. 2C, numeral 16 indicates an opening portion and numerals 30a, 30b indicate support portions.

As shown in FIG. 2, the holder 3 of this embodiment is a frame-like body (or a cylindrical body) having a rectangular cross-sectional shape and the support portions (30a, 30b) which support the liquid crystal display panel are formed therein while forming the opening portion 16.

The liquid crystal display panel is fixed to the support portions (30a, 30b) of the holder 3 by using the pressure sensitive adhesive double coated tape 13. Further, the white light emitting diodes 1 are mounted on the flexible printed wiring board 2 and are arranged in a state that the incident surface 5 of the light guide plate 4 which is arranged in the inside of the holder 3 and the light emitting surfaces 6 of the white light emitting diodes 1 are aligned with each other.

Here, it is preferable that the flexible printed wiring board 2 is fixed to the holder 3 using an adhesive tape or the like.

This embodiment is characterized in that in the support portion 30a of the holder 3, recessed portions 12 each of which is made as small as possible while having a size set larger than a maximum profile size which the white light emitting diode 1 can assume (a maximum profile size which the white light emitting diode 1 can assume as viewed from the liquid crystal display panel side) are formed.

Figure 3:
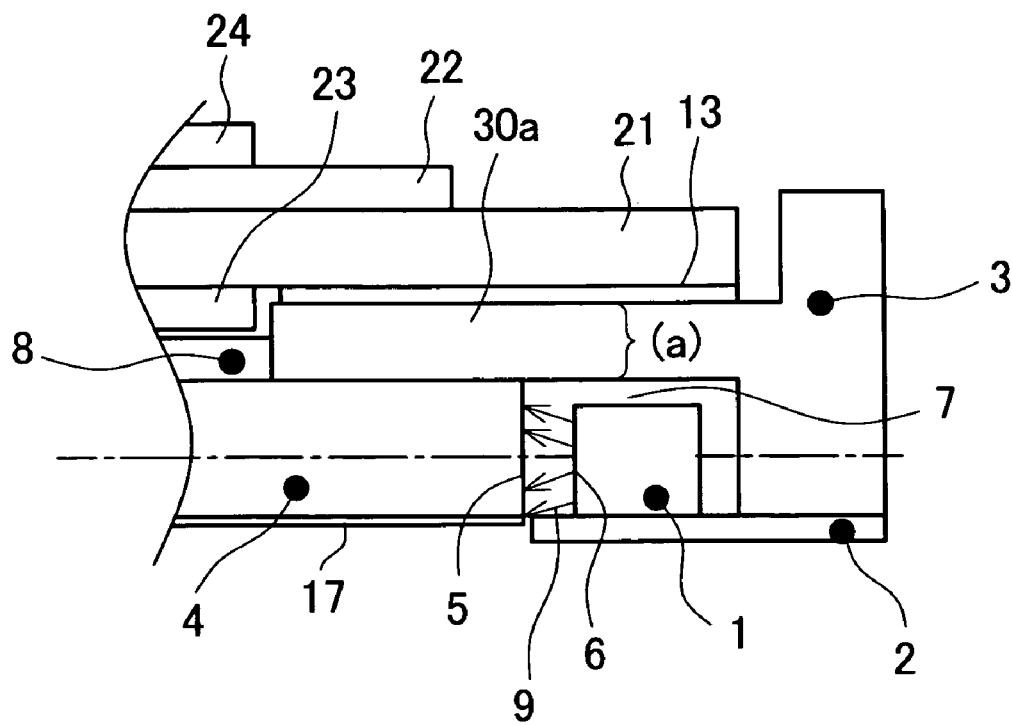
FIG. 3 is a cross-sectional view showing a cross-sectional structure in the vicinity of a white light emitting diode in a conventional liquid crystal display module.

FIG. 3 is a cross-sectional view showing the cross-sectional structure of a conventional liquid crystal display module in the vicinity of a white light emitting diode.

As shown in FIG. 3, in the conventional liquid crystal display module, a white light emitting diode 1 and a light guide plate 4 are arranged in the inside of a holder 3 in a state that the center of a light emitting surface 6 of the white light emitting diode 1 and the center of an incident surface 5 of the light guide plate 4 are aligned with each other and, further, a clearance 7 is formed between the white light emitting diode 1 and the holder 3 thus preventing the white light emitting diode 1 and the holder 3 from coming into contact with each other.

In recent years, also in the liquid crystal display module which is used as the display part of the portable equipment such as the mobile phone, there has been a demand for the reduction of thickness of the display module.

When the thickness of the liquid crystal display module is to be reduced, it is necessary to reduce respective thicknesses of the white light emitting diodes 1, the light guide plate 4 and the group of optical sheets 8 and, at the same time, it is also necessary to reduce a thickness ("a" shown in FIG. 3) of a support portion (30a, 30b) of the holder 3. It is further necessary to minimize the clearance 7 to reduce the thickness of the liquid crystal display module.

Figure 4:
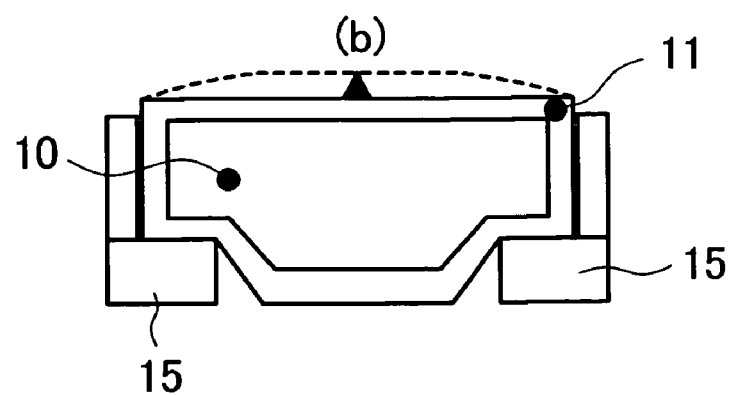
FIG. 4 is a view showing details of the white light emitting diode 1.

The detail of the white light emitting diode 1 is shown in FIG. 4. Here, the white light emitting diode 1 is configured such that a light emitting portion 10 is covered with a resin separator 11. In FIG. 4, numerals 15 indicate electrodes.

In a reflow step for fixing the white light emitting diodes 1 to a flexible printed wiring board (FPC) 2 by soldering, a the separator 11 made of resin is thermally expanded and this thermal expansion of the separator 11 may cause the permanent deformation of the separator 11 thus increasing a profile size of the white light emitting diode 1 which exhibits a shape shown in FIG. 4(b).

Further, there may also arise a case in which the white light emitting diode 1 is deformed by external energy other than the thermal expansion.

Figure 5:
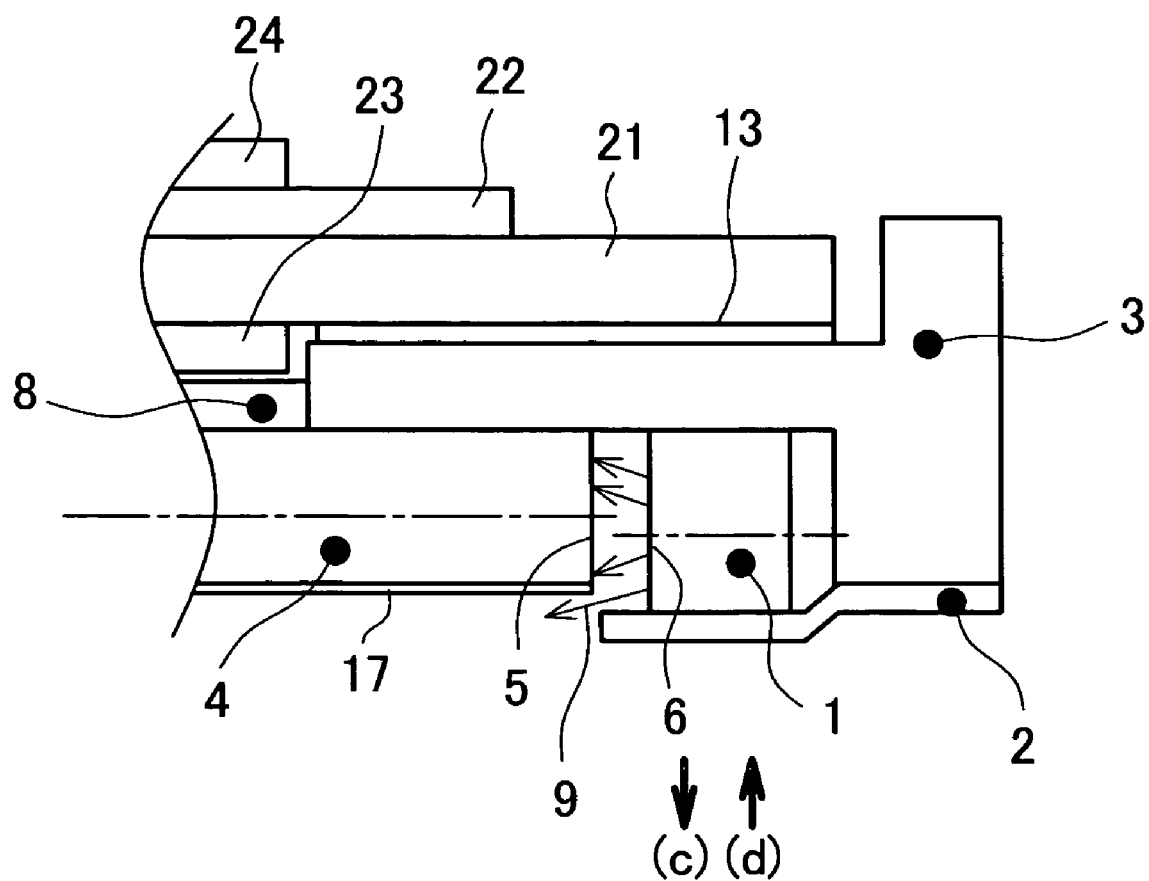
FIG. 5 is a cross-sectional view showing the cross-sectional structure in the vicinity of a white light emitting diode in a conventional liquid crystal display module when a profile size of the white light emitting diode 1 is increased.

FIG. 5 is a cross-sectional view showing the cross-sectional structure in the vicinity of the white light emitting diode when the profile size of the white light emitting diode 1 is increased in the conventional liquid crystal display module.

Depending on a size of the clearance 7 shown in FIG. 3, when an amount of increase in the profile size of the white light emitting diode 1 is large, the white light emitting diode 1 and the holder 3 are brought into contact with each other and hence, the white light emitting diode 1 is pushed downwardly in the direction indicated by an arrow (c) in FIG. 5.

Accordingly, the white light emitting diode 1 assumes a shape which projects from the holder 3 and hence, when an external pressure is applied to the white light emitting diode 1 in the direction indicated by an arrow (d) in FIG. 5, the white light emitting diode 1 is pressed between the external pressure and the holder 3 and hence, in a worst case, the white light emitting diode 1 may be broken.

Further, since the white light emitting diode 1 is pushed downwardly in the direction indicated by the arrow (c) in FIG.

5, the center of the light emitting surface 6 of the white light emitting diode 1 is offset from the center of the incident surface 5 of the light guide plate 4. Accordingly, a portion of light 9 which is emitted from the white light emitting diode 1 does not enter the incident surface 5 of the light guide plate 4 and is emitted to the outside of the light guide plate 4 and hence, the brightness of the backlight is lowered.

The holder 3 is formed of a synthetic resin by injection molding. Here, to cope with the above-mentioned drawbacks, it may be possible to reduce a thickness ("a" shown in FIG. 3) of the support portion (30a, 30b) of the holder 3 shown in FIG. 3. However, with respect to the holder 3 which is manufactured using the injection molding, the resin does not reach a portion of the holder 3 which has a reduced thickness and hence, a shrinkage cavity which causes a non-uniform thickness is generated.

Further, due to the reduction of thickness ("a" shown in FIG. 3) of the support portions (30a, 30b) of the holder 3, strength of the holder 3 is lowered thus deforming the holder 3.

As shown in FIG. 1 and FIG. 2, in this embodiment, in the lower side (the side opposite to a side which supports the liquid crystal display panel) of the support portion 30a of the holder 3, the recessed portions 12 which are made as small as possible while having the size set larger than a maximum profile size which the white light emitting diodes 1 can assume are formed. The recessed portions 12 are formed at positions where the recessed portions 12 face the white light emitting diodes 1.

In this manner, when the recessed portions 12 are formed in portions of the support portion 30a of the holder 3, an area of portions which have a reduced thickness can be made small and hence, there is no possibility that a shrinkage cavity is formed due to injection molding. Further, with respect to strength of the holder 3, since a periphery of the recessed portion 12 ensures a large thickness, the lowering of the strength can be reduced compared to a case in which the thickness of the whole holder 3 is reduced.

Accordingly, in this embodiment, when the profile size of the white light emitting diode 1 is increased, a distal end portion of the white light emitting diode 1 on a side which faces the support portion 30a in an opposed manner is housed in the inside of the recessed portion 12 which is formed in the holder 3 and, as a result, the white light emitting diode 1 is not brought into contact with the holder 3 as described above and the rupture of the white light emitting diode 1 and lowering of the brightness of the backlight can be prevented.

Accordingly, it is possible to achieve not only the enhancement of the reliability of the liquid crystal display module but also the enhancement of brightness characteristic of the backlight and the reduction of the brightness irregularities of the backlight.

Here, the present invention is not limited to the constitution in which the flexible printed wiring board 2 on which the white light emitting diodes 1 are mounted is fixed to the holder 3. For example, the present invention is applicable to other constitutions for arranging the white light emitting diodes 1 in the inside of the holder 3 such as the constitution in which a flexible printed circuit board 2 on which white light emitting diodes 1 are mounted is fixed to a housing not shown in the drawing which accommodates a backlight or the constitution in which a flexible printed circuit board 2 on which white light emitting diodes 1 are mounted is sandwiched between a bottom surface of a housing not shown in the drawing and the holder 3.

Further, the present invention is not limited to the constitution which uses the white light emitting diodes as the light source of the backlight and the present invention is also applicable to the constitution which uses light emitting diodes having another color or other light emitting elements.

The invention made by the present inventors has been explained in detail heretofore based on the above-mentioned embodiment. However, it is needless to say that the present invention is not limited to the above-mentioned embodiment and various modifications can be made without departing from the gist of the present invention.

What is claimed is:

1. A liquid crystal display device comprising:
a backlight; and
a liquid crystal display panel which is arranged above the backlight and which includes a display surface, wherein:
the backlight includes a frame-like holder, a light emitting element which is housed in the inside of the frame-like holder, and a light guide plate located so that light emitted from the light emitting element in a first direction is incident on the light guide plate,
the frame-like holder includes an opening portion and support portions which support the liquid crystal display panel,
the liquid crystal display panel is disposed on upper surfaces of the support portions,
the light guide plate is arranged under the support portions on lower surfaces of the support portions,
the light emitting element is mounted directly on a flexible printed wiring board, and is arranged under one of the support portions of the frame-like holder adjacent the lower surface of the one of the support portions and adjacent the light guide plate, and
the one of the support portions includes a recessed portion which is formed entirely on a first external side of the one of the support portions, where the lower surface of the support portion is located, opposite to a second side of the one of the support portions, where the upper surface of the support portion is located, which supports the liquid crystal display panel and at a position which faces the light emitting element in an opposed manner in a second direction which is different than the first direction, and
the recessed portion extends depthwise in a direction perpendicular to the display surface of the liquid crystal display panel.

2. A liquid crystal display device according to claim 1, wherein a distal end portion of the light emitting element on a side which faces the one of the support portions in an opposed manner is positioned in the inside of the recessed portion.

3. A liquid crystal display device according claim 1, wherein the flexible printed wiring board is fixed to a frame portion of the frame-like holder.

4. A liquid crystal display device according claim 1, wherein the light emitting element is formed of a white light emitting diode.

5. A liquid crystal display device according to claim 1, wherein the liquid crystal display panel is arranged in the inside of the frame-like holder and above the one of the support portions of the frame-like holder.

6. A liquid crystal display device according to claim 1, wherein the light emitting element is not disposed within the one of the support portions of the frame-like holder and is supported in the backlight by a member other than the frame-like holder and the one of the support portions thereof.

7. A liquid crystal display device according to claim 1, wherein an entirety of the recessed portion of the one of the support portions is entirely disposed above the light emitting element.

8. A liquid crystal display device according to claim 1, wherein a space is provided between a bottom surface of the recessed portion and an upper surface of the light emitting element.

9. A liquid crystal display device comprising:
a backlight; and
a liquid crystal display panel which is arranged above the backlight, wherein
the backlight includes a frame-like holder, and a light emitting element which is housed in the inside of the frame-like holder, and a light guide plate located so that light emitted from the light emitting element in a first direction is incident on the light guide plate,
the frame-like holder includes an opening portion and support portions which support the liquid crystal display panel,
the liquid crystal display panel is disposed on upper surfaces of the support portions,
the light guide plate is arranged under the support portions on lower surfaces of the support portions,
the light emitting element is mounted directly on a flexible printed wiring board, and is arranged under one of the support portions of the frame-like holder adjacent the lower surface of the one of the support portions and adjacent the light guide plate, and
the one of the support portions includes a recessed portion which decreases a thickness of the frame-like holder between the liquid crystal display panel and the light emitting element and is formed entirely on a first external side of the one of the support portions, where the lower surface of the support portion is located, opposite to a second side of the one of the support portions which supports the liquid crystal display panel, where the upper surface of the support portion is located, and at a position which faces the light emitting element in an opposed manner in a second direction which is different than the first direction.

10. A liquid crystal display device according to claim 9, wherein a space is provided between a bottom surface of the recessed portion and an upper surface of the light emitting element.

11. A liquid crystal display device according to claim 1, wherein said recessed portion includes an opening for receiving said light emitting element, wherein said opening is formed in said first external side of said one of said support portions.

12. A liquid crystal display device according to claim 9, wherein said recessed portion includes an opening for receiving said light emitting element, wherein said opening is formed in said first external side of said one of said support portions.

13. A liquid crystal display device according to claim 1, wherein the second direction is substantially perpendicular to the first direction.

14. A liquid crystal display device according to claim 9, wherein the second direction is substantially perpendicular to the first direction.

* * * * *